May 9, 1967 W. WALLER 3,318,434
APPARATUS FOR THE AUTOMATIC FEED OF PULL-OFF CLOSURES
Filed March 16, 1965
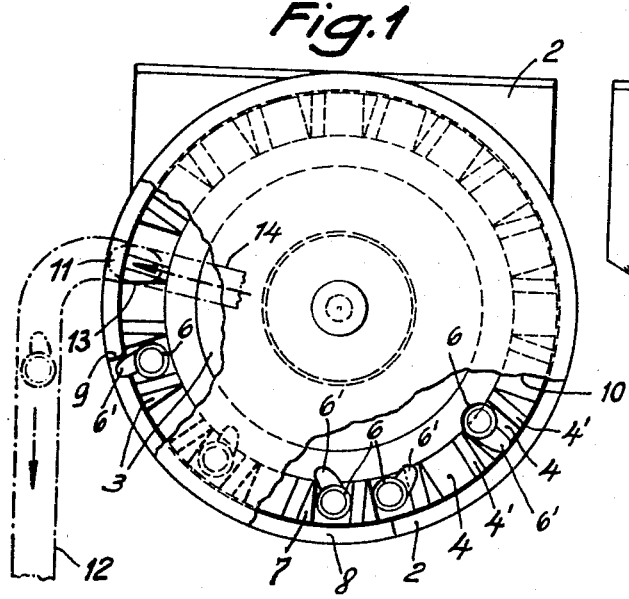
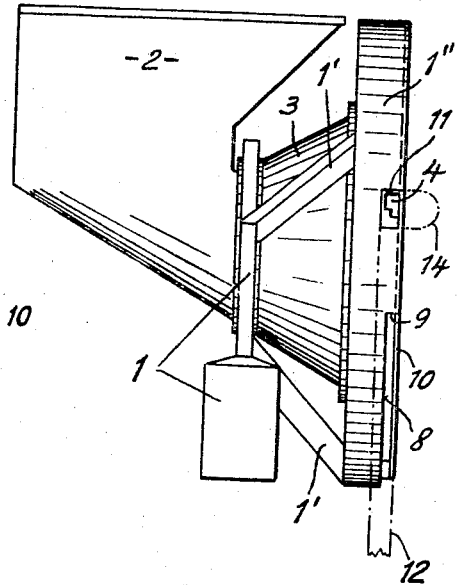
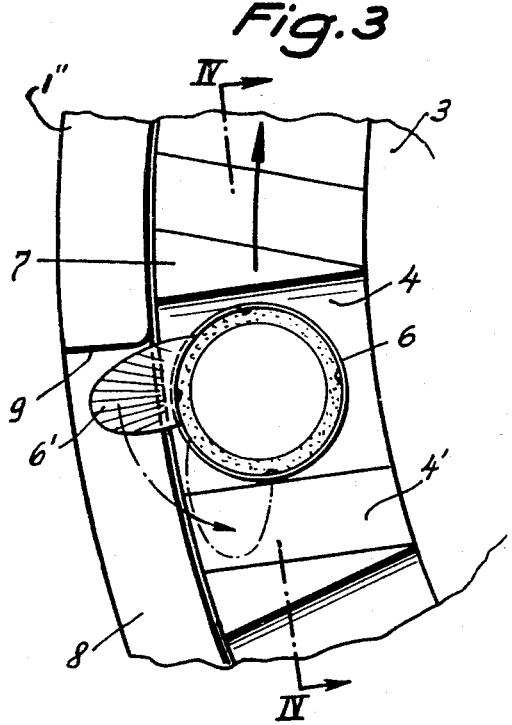
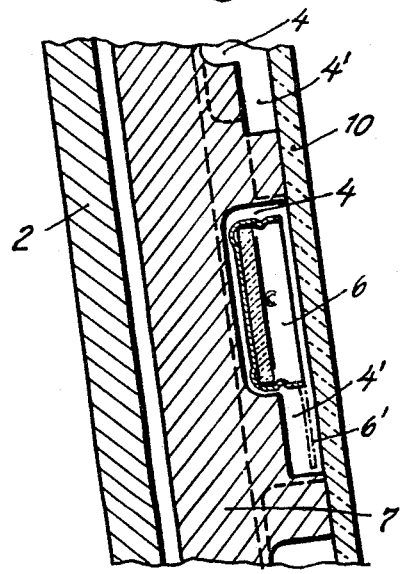
INVENTOR:
Willy Waller
BY
Karl F. Ross
Attorney

# United States Patent Office 3,318,434
Patented May 9, 1967

3,318,434
APPARATUS FOR THE AUTOMATIC FEED OF PULL-OFF CLOSURES
Willy Waller, Oberallmendstr. 16, Zug, Switzerland
Filed Mar. 16, 1965, Ser. No. 440,238
3 Claims. (Cl. 198—33)

ABSTRACT OF THE DISCLOSURE

This disclosure is directed to an apparatus for the automatic feed of pull-off closures to a sealing machine adapted to apply them to bottles or like receptacles, the device including a rotatable cap-sorting drum whose circumferential cavities each receive a respective pull-tab cap and cooperate with an abutment in the path of any outwardly projecting tabs for swinging them into the cavities and thereby orienting the caps for application to the receptacles.

---

This invention relates to an apparatus for the automatic feed of pull-off closures of metal or plastic foil, especially of aluminum, to closing machines for the sealing of containers.

It is known to close bottles, etc. automatically with machines having two units, a punch and a closing part whereby ready-punched closures are automatically placed onto the mouths of bottles or boxes and then sealed therearound. In such closures the main trouble was offered by the so-called "pull-off" lugs or tongues.

All of the tab-feed systems known heretofore were unsuccessful in orienting the pull-off lugs or tabs perfectly in one direction. The pull-off closures thus fed caused trouble either in the closing head or in the distribution, because they could enter the closing head with improper orientation. Such trouble led to breakage of bottles and costly interruptions in service.

It is the principal object of this invention to obviate these disadvantages.

The advantage of the invention lies in the perfect, invariably uniform directing of the pull-off lugs to the rear. This position permits a reliable, faultless feed into the closing head of the machine, or a faultless reception of the pull-off closure by the bottle mouth to be closed.

The principal feature of the present invention resides in the provision of a rotatable sorting drum having a plurality of recesses along its circumference of a configuration corresponding to that of the cross-section of the closures or bottle caps which move successively past a stop or cam member just outwardly of the drum circumference and adapted to cam the tabs inwardly as the bottle caps are shifted therepast so that the tabs swing behind the bodies of the respective caps in the sense of movement of the drum. The drum co-ordinates with a feed means for supplying the caps successively to the recesses at one part of the path of the sorting drum (downstream of the cam or stop) and with a discharge means for leading the caps away from the drum at a portion of its path upstream from the cam or stop.

Advantageously, the sorting drum is provided with a transparent closure plate at its outlet side overlying the recesses.

The above and other objects, features and advantages of the present invention will become more readily apparent from the following description, reference being made to the accompanying drawing in which:

FIG. 1 is a front view of the sorting apparatus with the transparent cover plate partly broken away;

FIG. 2 is a side view of the apparatus shown in FIG. 1;

FIG. 3 is a detail view of a portion of the drum of FIG. 1 drawn to a larger scale; and FIG. 4 is a cross-sectional view taken along the line IV—IV of FIG. 3.

In the drawing, I show a sorting apparatus comprising a support structure 1, 1′, 1″ designed to mount the unit upon a conventional bottle sealing machine. The unit comprises a funnel-shaped sealing-cap or closure container 2 which is supplied to a rotating sorting drum 3 rotatable upon a horizontal axis. The sorting drum 3 widens conically outwardly (i.e. to the right in FIG. 2). At the wide portion of the drum 3, it is encircled by a ring 1″ of the support means so that the rim 7 of this drum is surrounded coaxially by the ring 1″. The rim 7 is provided with a multiplicity of clearances or cavities 4 which accommodate the sealing caps or closures 6. Each of the cavities 4 has a recessed part 4′ of approximately half the depth of the cavities for accommodating the tearing tab 6′ of the cap 6. The peripheral ring 1″ is designed to clear the tearing tabs 6′ of those caps 6 which may have fallen into their respective cavites 4 in reverse position. All of the sealing caps whose tabs 6′ extend into the recess 8 are rotated in accordance with the present invention into a position in which the tab 6′ is swung into the recessed portion 4′ of the cavity.

To this end, the recess 8 terminates at a cam or stop 9 engageable with those tearing tabs which project outwardly from the respective recesses 4 as the drum 3 is rotated in the clockwise sense (FIG. 3). The stop 9 thus swings the tab 6′ (dot-dash line in FIG. 3) through an angle of up to 90° until the closure 6 seats properly in its cavity 4.

The open end (right-hand side in FIG. 2) of the drum 3 and its cavities 4 are covered by a transparent plate 10 of acrylic glass through which the operation of the drum and the locations of the caps can be observed.

At a discharge point along the rotary path of the drum, the cavities 4 are aligned with outlet orifice 11 in the ring 1″ through which the caps 6 emerge into a feed conduit for delivery to the sealing devices of the apparatus. The discharge means 11, 12 are conventional and need not be further described here. It suffices to state that such conventional means can include an orifice 13 in the transparent plate 10 whereby an air conduit 14 can blow or "pneumatically feed" the closures 6 into the feed channel leading to the closure head of the apparatus. The feed channel 12 must be closed on either side and of such cross-section that the pull-off lugs or tabs are incapable of altering orientation as the caps 6 move to the sealing machine. In order to avoid overfilling of the feed channel with sealing caps, the feed channel 12 can be provided with a discharge orifice whereby any excess caps are deflected from the device.

What I claim is:

1. An apparatus for automatically feeding pull-tab caps to a sealing machine adapted to apply such caps to respective receptacles, comprising a rotatable cap-sorting drum provided with a circumferential area of cavities each dimensioned to receive a respective pull-tab cap with its respective tab extending outwardly thereof; support means for said drum including a ring closely surrounding said drum and substantially coplanar with said cavities, said ring being provided with a recess extending therealong for accommodating those tabs of caps in said cavities which project outwardly of said drum, and an abutment in the path of the outwardly projecting tabs at the end of said recess for engagement with the outwardly extending tabs upon entrainment of the respective caps therepast by feed drum for rotating each of the caps in the respective cavity to swing the respective outwardly extending tab into the cavity behind the body of the respective cap in the sense of rotation of said drum; supply means on said support means for feeding said caps to said cavities in succession at a point rearwardly of said abutment in the direction of rotation of said drum; and discharge means for serially removing said caps from said cavities at a location forwardly of said abutment in the sense of rotation of said drum.

2. An apparatus as defined in claim 1 wherein said cavities are provided with relatively deep portions for accommodating the bodies of said caps and respective recesses rearwardly of said deep portions in the direction of rotation of said drum and of a depth approximately half that of said deep portions for accommodating the tabs of the respective caps when they are swung inwardly by engagement with said abutment.

3. An apparatus as defined in claim 1, wherein said cavities are provided along the periphery of a disk forming the base of said drum, said drum diverging generally frustoconically in the direction of said disk, said apparatus further comprising a transparent plate overlying said disk and covering said cavities for permitting observation of the caps received therein.

References Cited by the Examiner
UNITED STATES PATENTS

| Re. 21,188 | 8/1939 | La Bounty | 198—33 |
| 549,467 | 11/1895 | Sisson | 221—168 |
| 1,140,090 | 5/1915 | Winter | 221—167 |
| 1,601,442 | 8/1926 | Havener | 221—169 |
| 1,606,185 | 11/1926 | Ross | 222—169 |
| 2,707,576 | 3/1955 | Fowler | 221—169 X |
| 3,015,378 | 1/1962 | Thurlings | 198—33 |
| 3,017,011 | 1/1962 | Meyer | 198—33 |

EVON C. BLUNK, *Primary Examiner.*

M. L. AJEMAN, *Assistant Examiner.*